June 16, 1942.  W. A. RAY  2,286,376
CONTROL SYSTEM
Original Filed Jan. 21, 1937
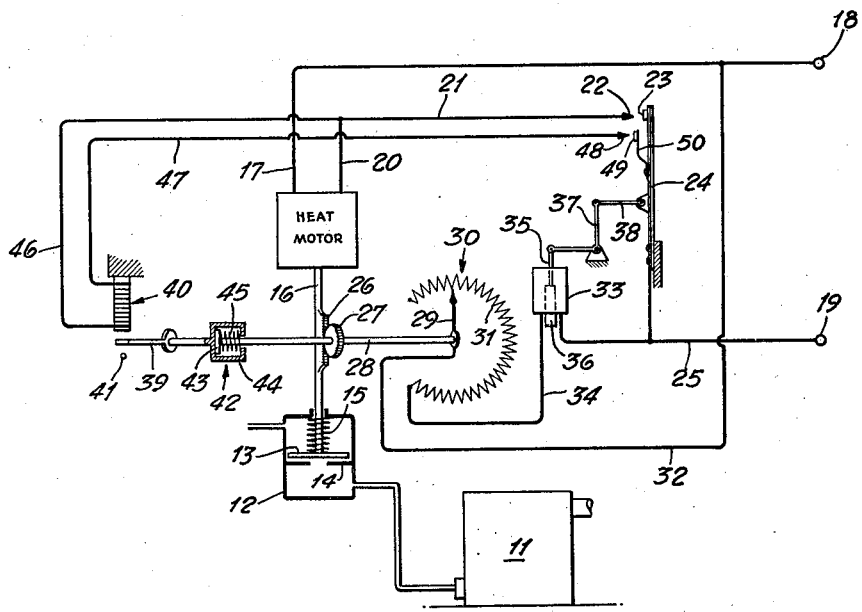
INVENTOR.
William A. Ray
BY John H. Rouse,
ATTORNEY Patented June 16, 1942

2,286,376

UNITED STATES PATENT OFFICE 2,286,376

CONTROL SYSTEM

William A. Ray, Glendale, Calif., assignor to General Controls Company, a corporation of California Continuation of application Serial No. 121,575, January 21, 1937. This application June 25, 1940, Serial No. 342,332

9 Claims. (Cl. 236—68)

My present invention relates to condition control systems, and particularly to a modulating system wherein a member, movable to a plurality of positions for variably controlling a condition, such as temperature, pressure, or the like, is positioned in accordance with the existing variation of the condition from a predetermined value.

It is an object of this invention to provide means for accurately so positioning a condition-controlling member when the means employed for moving the member is in the form of a motor which is affected by ambient conditions, such as a heat motor.

A particular object of my invention is to provide, in a system of the character described, means for "floating" a heat motor, i. e., maintaining it substantially in a predetermined condition irrespective of the effect thereon of ambient temperature tending to change that condition.

It is a further object to provide simple, dependable and effective means for accomplishing the above-stated objects; an important feature being the inclusion in said means of a slip-clutch.

Other objects and advantages of my invention will be found in the description, the drawing, and the appended claims.

This application is a continuation of my co-pending application, Serial No. 121,575, filed January 21, 1937; the subject matter of the present application being limited to the control system shown in Fig. 9 of the copending application referred to.

For complete understanding of the invention, reference may be had to the following detailed description and accompanying drawing, wherein the single figure is a diagrammatic view of a heating control system embodying my invention.

In the drawing, the numeral 11 indicates a gas-consuming furnace, fuel supply to which is controlled by a modulating valve 12, which comprises a valve member 13 cooperable with a valve seat 14 and biased theretoward by a compression spring 15. The stem 16 of the valve member is connected to a heat motor, indicated by the legend. This motor may be of the general type shown in the Fulton Patent No. 904,123 and comprises expansible-contractible means, such as a bellows, containing a volatile fluid. Upon heating, as by an electrical heating coil, the fluid boils and causes a movable wall associated with the bellows to raise the valve stem. Upon interruption of the heating current, the fluid cools and the valve stem accordingly falls.

One lead 17 of the heat motor is directly connected to the terminal 18 of the terminals 18 and 19 provided for the connection of a convenient source of electrical energy. The other heat motor lead 20 is connected by a wire 21 to a fixed contact element 22 with which another contact element 23, carried by a bimetallic member 24, cooperates. The member 24 is connected to a wire 25 extending from the other power connecting terminal 19. It will thus be seen that the energization of the heat motor is normally controlled by the movement of the bimetallic member and that, accordingly, the valve 12 would either be open or closed dependent on the condition of contacts 22 and 23.

To modify such control action of the bimetallic member or thermostat 24, the valve stem 16 is provided with a rack portion 26 cooperable with a pinion 27 fixed to a rotatable shaft 28. Carried by this shaft is the contact arm 29 of a rheostat 30 comprising a resistance winding 31. The rheostat arm is connected by a wire 32 to the supply terminal 18, and one end of the rheostat winding 31 is connected through the coil of a solenoid 33 to the other supply terminal 19, by wires 34 and 25. The stem 35 of the solenoid plunger 36 is connected by a bell crank 37 and link 38 to the bimetallic member. It will thus be seen that a force is applied to the bimetallic member which varied depending upon the condition of the valve. This force is in a direction tending to separate the contacts 22 and 23, the solenoid plunger being so positioned with respect to its coil as to move upward when it is energized. When the valve is closed, only a negligible force is produced by the solenoid on account of the high resistance of the rheostat winding, through all of which the current must then flow. When the valve is fully open, maximum force is exerted, as all the rheostat winding is then cut out by the arm. The force produced by the solenoid is relatively small and may correspond approximately to the effect of a change in temperature of the thermostat of two to four degrees when the same is employed for typical space heating control. In industrial applications, the biasing or loading effect of the solenoid may be considerably greater. It is obvious that means other than those disclosed herein could be provided for variably biasing the thermostat according to the valve position; as an extreme example: a spring directly interconnecting the bimetallic member and the valve stem.

Connected to the end of shaft 28 opposite to the rheostat, is an arm 39 which, in its upward movement, is adapted to engage and compress a "carbon pile" 40 which may consist of a number of normally loosely-stacked graphite disks.

Downward movement of arm 39 is limited by a stop pin 41. The arm 39 is connected to shaft 28 through a slip-clutch 42 which comprises a disk 43 fixed to the shaft and held in engagement with the inner surface of a socket 44, fixed to the arm, by the tension of a spring 45. This slip-clutch permits the arm to be moved by the rotation of the shaft into engagement with the carbon pile or the stop pin; further movement of the shaft effecting pressure on the carbon pile or the pin as the clutch slips. It will thus be seen that a small downward movement of the valve stem, from any position, effects compression of the carbon pile, the pressure being immediately released upon upward movement of the valve stem.

The lower terminal of the carbon pile is connected by wire 46 to the lead 20 of the heat motor, and the upper terminal of the pile is connected by wire 47 to a fixed contact 48, with which is cooperable a contact element 49 carried by a flexible arm 50 secured to the bimetallic member 24. When contacts 48 and 49 (only) are in engagement, the power circuit is complete to the heat motor: from terminal 18 directly through lead 17; and from terminal 19 through wire 25, bimetal 24, arm 50, contacts 49 and 48, wire 47, the carbon pile, wire 46, and lead 20. When contacts 22 and 23 are additionally in engagement, the carbon pile circuit is shunted out by the bimetal and the heat motor is fully energized; the carbon pile is thus effective when contacts 48 and 49, only, are engaged. When the carbon pile is uncompressed by the arm 39, its resistance is so high that only a negligible amount of current can pass through it, but when the pile is fully compressed its resistance is very low and substantially full heating of the motor results. The change in resistance of the carbon pile is relatively abrupt and is effected by a small movement of arm 39. Obviously, any form of rheostat having these characteristics could be substituted for the carbon pile, or, under some conditions, a momentary-contact normally-open switch could be provided for actuation by the upward movement of arm 39, in place of the carbon pile. The purpose of the rheostat comprising the "carbon pile" and its slip-clutch controlled actuator is to provide momentary energization of the heat motor upon initial downward movement of the valve stem from a modulating position, as will be more fully described hereinafter.

The operation of the control system will now be described; it being assumed that the bimetallic member or thermostat 24 is located in a space heated by the furnace 11 and that it is arranged to warp toward contact-closing position upon fall of temperature.

Assuming further that heating is discontinued at night and that, when the system is put into operation in the morning, the temperature of the space is considerably below that for which the thermostat is set, both pairs of contacts 22—23 and 48—49 therefore being tightly closed, continuous energization of the heat motor results and the valve is promptly moved to full open position. The solenoid 33 is therefore now exerting its maximum force tending to separate the contacts (the resistance of rheostat 30 being at its minimum), but, as has been explained, this force is approximately only equal to the force produced by increasing the temperature of the thermostat 2-4 degrees and thus is not sufficient to open the contacts. As the temperature of the space accordingly rises, when it is a few degrees below the desired temperature for which the thermostat is set, the force of the solenoid opens contacts 22—23, the contacts 48—49 remaining in engagement with the arm 50 flexed inwardly. But, as the carbon pile 40 is now uncompressed, no appreciable amount of current flows through contacts 48—49, and so the heat motor is permitted to cool. When the motor has cooled sufficiently, the valve stem starts to fall under the force of spring 15, moving the arm 39 into engagement with the carbon pile and compressing it so that current again flows to the motor and the valve stem momentarily rises, the motor heating circuit being opened immediately upon disengagement of the arm 39. The motor is thus "floated" with the valve stem in a slightly lowered position. During the initial downward movement of the valve stem, the force produced by the solenoid was decreased, but if the heating of the space is gradual, there was still sufficient force on the thermostat due to temperature to prevent opening of contacts 48—49. Thus, the heat motor may continue to recycle under the influence of the carbon pile rheostat.

As the space temperature approaches closer to that desired, the contacts 48—49 open, completely deenergizing the heat motor. However, the decrease of solenoid force, which now results as the valve stem drops, permits reclosure of the contacts 48—49 by the thermostat, and, as the carbon pile is now compressed, momentary energization of the heat motor occurs which halts the valve stem in its lowered position. On further rise of space temperature, the operation is repeated. The valve is thus positioned according to the temperature requirements of the space.

Should the temperature of the space remain substantially constant for a considerable period of time with the contacts 48—49 in engagement, during this period the heat motor will be intermittently energized and deenergized by the carbon pile rheostat at intervals, the frequency of which depends on the degree of ambient temperature to which the heat motor is subjected. The heat motor is thus "floated" by the action of the carbon pile rheostat in a position determined by the effect of both temperature and solenoid force on the thermostat.

The small change in valve stem position, caused by the cooling of the motor, acts, through the carbon pile rheostat, to effect a relatively large momentary flow of heating current to the motor with the result that it tends immediately to reassume its former position. This operation is effective, on account of the slip-clutch arrangement, from any elevated position of the valve stem. The stop pin 41 should be so positioned as to limit the range of operation of the carbon pile rheostat to a small percentage of the total travel of the valve stem so as to prevent making or breaking of the thermostat contacts, but this range should also be great enough to prevent any hunting of the heat motor.

Obviously, upon further rise of temperature in the space, both pairs of thermostat contacts open, permitting the valve to completely close; there being no material "false temperature" effect produced by the solenoid when the valve is near its closed position.

If the space temperature now gradually falls, contacts 48—49 reengage and, as on valve closure the carbon pile was left in compressed condition, the heat motor is momentarily energized. As the valve stem rises, the contacts may be reopened by the solenoid, and the operation repeated. If the temperature continues to fall, on subsequent initial opening of the valve, the increased solenoid force will not be sufficient to overcome the temperature bias of the thermostat and the valve will remain in partly open condition. If, in spite of the moderate heating which then results, the space temperature continues to fall, contacts 22—23 will be engaged and the valve still further opened, its movement being again checked by the solenoid. In normal day operation, the valve may continue to move upward and downward within its modulating range, and only reach its full open-position if the space is subjected to excessive cooling.

While I have described my invention as applied to the control of a heating system, it is obviously not so limited, as changes within the scope of one skilled in the art may be made to effect the control of other condition-changing systems, such as, for instance, a cooling, super-heat, humidifying, pressure, speed, or liquid-level system. For example, in a liquid-level system, a float could be provided with sequential circuit-controlling means, similar to those of the thermostat in the heating system illustration, for controlling, by heat-motor-operated valve positioning means cooperating with the circuit controlling means, the rate of liquid flow in accordance with the variation of the liquid from a predetermined level. In a speed control system, the circuit controlling means could be associated with a governor.

It is to be understood that still other modifications may be made without departing from the spirit of my invention, and I intend therefore to be limited only by the scope of the appended claims.

I claim as my invention:

1. In combination: means for changing a condition; a member movable in opposite directions between limiting positions, and capable of assuming a plurality of other positions intermediate thereof, for varying the operation of said condition changing means; a heat motor for moving said movable member; means responsive to change in said condition for controlling the energization of said heat motor; means interconnecting said condition responsive means and said movable member for positioning the same in accordance with the variation of said condition from a predetermined value; and means responsive to an increment of movement of said movable member in only one of said directions for effecting energization of said heat motor, said last-named means including a slip-clutch.

2. In combination: means for changing a condition; a member movable in opposite directions between limiting positions, and capable of assuming a plurality of other positions intermediate thereof, for varying the operation of said condition changing means; an electrically energizable heat motor for moving said movable member; means responsive to change in said condition and electrically interconnected with said heat motor for controlling the energization of the same; means interconnecting said condition responsive means and said movable member for varying the effect of the condition responsive means upon the movable member so as to position the movable member in accordance with the variation of said condition from a predetermined value; and means controlled by the movement of said movable member for effecting energization of said heat motor, and actuated by an increment of movement of said member from any of said positions only in the direction in which it is moved by the deenergization of said heat motor.

3. In combination: means for changing a condition; a member movable in opposite directions between limiting positions, and capable of assuming a plurality of other positions intermediate thereof, for varying the operation of said condition changing means; a heat motor for moving said movable member; means responsive to change in said condition for controlling the energization of said heat motor; means interconnecting said condition responsive means and said movable member for positioning the same in accordance with the variation of said condition from a predetermined value; an element connected, by a slip-clutch, to said movable member so as to be moved thereby in both of said directions, and limited in its movement to a portion of the travel of the member; and means engageable by said element, for effecting energization of said heat motor, only when it is moved by the movement of said member in the direction in which the same is moved by the deenergization of said heat motor.

4. In combination: means for changing a condition; a member movable in opposite directions between limiting positions, and capable of assuming a plurality of other positions intermediate thereof, for varying the operation of said condition changing means; a heat motor for moving said movable member; means movable in response to change in said condition for controlling the energization of said heat motor; means interconnecting said movable member and said condition responsive means for varying the effect thereof upon the movable member so as to position the same in accordance with the variation of said condition from a predetermined value; an element connected, by a slip-clutch, to said movable member so as to be moved thereby in both of said directions, and limited in its movement to a portion of the travel of said member; and means for effecting energization of said heat motor and operated by said element only when it is moved by the movement of said member in the direction in which the same is moved by the deenergization of said heat motor; said last-named means including an electrical connection controlled by the movement of said condition responsive means.

5. In combination: means for changing a condition; a member movable in opposite directions between limiting positions, and capable of assuming a plurality of other positions intermediate thereof, for varying the operation of said condition changing means; a heat motor for moving said movable member; means movable in response to change in said condition for controlling the energization of said heat motor; means interconnecting said movable member and said condition responsive means for varying the effect thereof upon the movable member so as to position the same in accordance with the variation of said condition from a predetermined value; an element connected, by a slip-clutch, to said movable member so as to be moved thereby in both of said directions, and limited in its movement to a portion of the travel of said member; and means for effecting energization of said heat motor, and comprising a resistance varied by the engagement therewith of said element only when the same is moved by the movement of said member in the direction in which it is moved by the deenergization of said heat motor; said last-named means including heat motor circuit controlling means yieldably mounted on said condition responsive means.

6. In combination: means for changing the temperature of a space; a member movable in opposite directions between limiting positions, and capable of assuming a plurality of other positions intermediate thereof, for varying the operation of said temperature changing means; a heat motor for moving said movable member; means in said space, and responsive to the temperature thereof, for controlling the energization of said heat motor; means interconnecting said temperature responsive means and said movable member for positioning the same in accordance with the temperature requirements of said space; and means responsive to an increment of movement of said movable member in only one of said directions for effecting energization of said heat motor, said last-named means including a slip-clutch.

7. In combination: means for changing the temperature of a space; a member movable in opposite directions between limiting positions, and capable of assuming a plurality of other positions intermediate thereof, for varying the operation of said temperature changing means; a heat motor for moving said movable member; means in said space, and responsive to the temperature thereof, for controlling the energization of said heat motor; means interconnecting said temperature responsive means and said movable member for positioning the same in accordance with the temperature requirements of said space; an element connected, by a slip-clutch, to said movable member so as to be moved thereby in both of said directions, and limited in its movement to a portion of the travel of the member; and means engageable by said element, for effecting energization of said heat motor, only when it is moved by the movement of said member in the direction in which the same is moved by the deenergization of said heat motor.

8. In combination: means for changing the temperature of a space; a member movable in opposite directions between limiting positions, and capable of assuming a plurality of other positions intermediate thereof, for varying the operation of said temperature changing means; a heat motor for moving said movable member; means in said space, and movable in response to changes in the temperature thereof, for controlling the energization of said heat motor; means interconnecting said movable member and said temperature responsive means for varying the effect thereof upon the movable member so as to position the same in accordance with the temperature requirements of said space; an element connected, by a slip-clutch, to said movable member so as to be moved thereby in both of said directions, and limited in its movement to a portion of the travel of said member; and means for effecting energization of said heat motor and operated by said element only when it is moved by the movement of said member in the direction in which the same is moved by the deenergization of said heat motor; said last-named means including an electrical connection controlled by the movement of said space temperature responsive means.

9. In combination: means for changing the temperature of a space; a member movable in opposite directions between limiting positions, and capable of assuming a plurality of other positions intermediate thereof, for varying the operation of said temperature changing means; a heat motor for moving said movable member; means in said space, and movable in response to changes in the temperature thereof, for controlling the energization of said heat motor; means interconnecting said movable member and said temperature responsive means for varying the effect thereof upon the movable member so as to position the same in accordance with the temperature requirements of said space; an element connected, by a slip-clutch, to said movable member so as to be moved thereby in both of said directions, and limited in its movement to a portion of the travel of said member; and means for effecting energization of said heat motor, and comprising a resistance varied by the engagement therewith of said element only when the same is moved by the movement of said member in the direction in which it is moved by the deenergization of said heat motor; said last-named means including heat motor circuit controlling means yieldably mounted on said space temperature responsive means.

WILLIAM A. RAY.